United States Patent
Hook et al.

[19]

[11] Patent Number: 6,134,781
[45] Date of Patent: Oct. 24, 2000

[54] METHOD FOR MAKING A THROAT INSERT FOR ROCKET THRUSTERS

[75] Inventors: Dale L. Hook, Rancho Palos Verdes; Thomas M. Rust, Manhattan Beach; Scott J. Rotenberger, Redondo Beach, all of Calif.

[73] Assignee: TRW Inc., Redondo Beach, Calif.

[21] Appl. No.: 08/916,379

[22] Filed: Aug. 22, 1997

Related U.S. Application Data

[62] Division of application No. 08/688,628, Jul. 29, 1996, Pat. No. 5,802,842.

[51] Int. Cl.$^7$ ...................................................... B23P 15/00

[52] U.S. Cl. ............................ 29/890.01; 164/80; 164/98; 164/111

[58] Field of Search ........................... 29/890.01; 164/80, 164/98, 111

[56] References Cited

U.S. PATENT DOCUMENTS

| | | | |
|---|---|---|---|
| 3,485,290 | 12/1969 | Campbell | 164/80 X |
| 3,888,295 | 6/1975 | Schillinger | 164/80 X |
| 4,584,171 | 4/1986 | Niino et al. | 29/890.01 X |
| 5,572,865 | 11/1996 | Sackheim et al. | |

*Primary Examiner*—Charles T. Jordan
*Attorney, Agent, or Firm*—Michael S. Yatsko

[57] ABSTRACT

A thruster rocket engine throat insert (12) has a thin walled shell (54) made from a high strength, oxidation resistant material. The shell (54) having a throat (48) of reduced cross-section and a radially extending annular stiffening ring (60) located at the throat (48). A casing (56) made from a material having a thermal conductivity at least 10 times greater than that of shell (54) is molded around an outer surface (58) of shell (54) and has a generally cylindrical exterior surface (59). Shell (54) resists yielding and oxidation caused by the extreme temperatures of rocket fuel combustion products passing through the throat insert (12), while the casing (56) acts to efficiently transfer heat from the shell (54).

9 Claims, 2 Drawing Sheets

METHOD FOR MAKING A THROAT INSERT FOR ROCKET THRUSTERS

This is a divisional of U.S. patent application Ser. No. 08/688,628, filed Jul. 29, 1996, now U.S. Pat. No. 5,802,842.

BACKGROUND OF THE INVENTION

1. Technical Field

This invention relates generally to rocket thrusters and more particularly, to small regeneratively cooled rocket thruster engines having a dimensionally stable throat insert installed therein.

2. Discussion

In a regeneratively cooled bipropellant rocket motor the thruster is cooled using the latent heat of vaporization of the oxidizer flowing through coolant passages in the wall of the thruster chamber. In this type of cooled thruster design, there exists a large thermal gradient between the inner wall of the thruster chamber and the coolant passages. The thermal gradient is particularly large at the throat of the rocket thruster where heat loads and operating temperatures are at their greatest. These large thermal gradients cause local yielding of the material between the throat surface and the surface of the cooling passages. As a result of this yielding, there is a phenomena created called thermal ratcheting. Thermal ratcheting results in a radically inward shrinkage of the throat of the thruster after each firing or thermal cycle of the thruster. A reduction in throat area of up to forty-five percent has been observed within only sixty thermal cycles. Reductions in the throat area of this magnitude are clearly unacceptable after so few thermal cycles, particularly when considering that this type of thruster is often required to complete 700 cycles over the life of the thruster.

The problem of thermal ratcheting has proven to be difficult to overcome. Thermal gradients can be reduced by using materials having high thermal conductivity, but the yield strength and oxidation resistance of such materials is generally below that necessary for this type of application. Conversely, high strength materials which are more resistant to thermal ratcheting and exhibit good oxidation resistance typically have low thermal conductivities. The low thermal conductivity of such materials actually results in higher thermal gradients and related stresses, which may ultimately cause yielding and some thermal ratcheting.

While thermal ratcheting is not solely unique to bipropellant rocket thrusters, monopropellant thrusters are much less susceptible to thermal ratcheting because the thermal gradients are not as severe. However, any improvement in the reduction of thermal ratcheting which is developed for bipropellant rocket thrusters can of course be applied when the thrusters are operated as a monopropellant thruster, even though the need is not as great.

SUMMARY OF THE INVENTION

In accordance with the teachings of the present invention, there is disclosed a dimensionally stable throat insert and a method of making and using the throat insert. The throat insert has a thin walled shell made from a high strength, oxidation resistant material. The shell has a throat of reduced cross-section and a radially extending annular stiffening ring located at the throat. A casing is molded around an outer surface of the shell and has a generally cylindrical exterior surface which allows the throat insert to be installed in a thruster rocket engine. The casing is made from a material having a thermal conductivity at least 10 times greater than that of the shell. The shell resists yielding and oxidation caused by the extreme temperatures of rocket fuel combustion products passing through the throat insert, while the casing acts to efficiently transfer heat from the shell to the cooling passages.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENT

The following description of the preferred embodiment is merely exemplary in nature and is in no way intended to limit the invention, its application, or uses.

Figure 1:
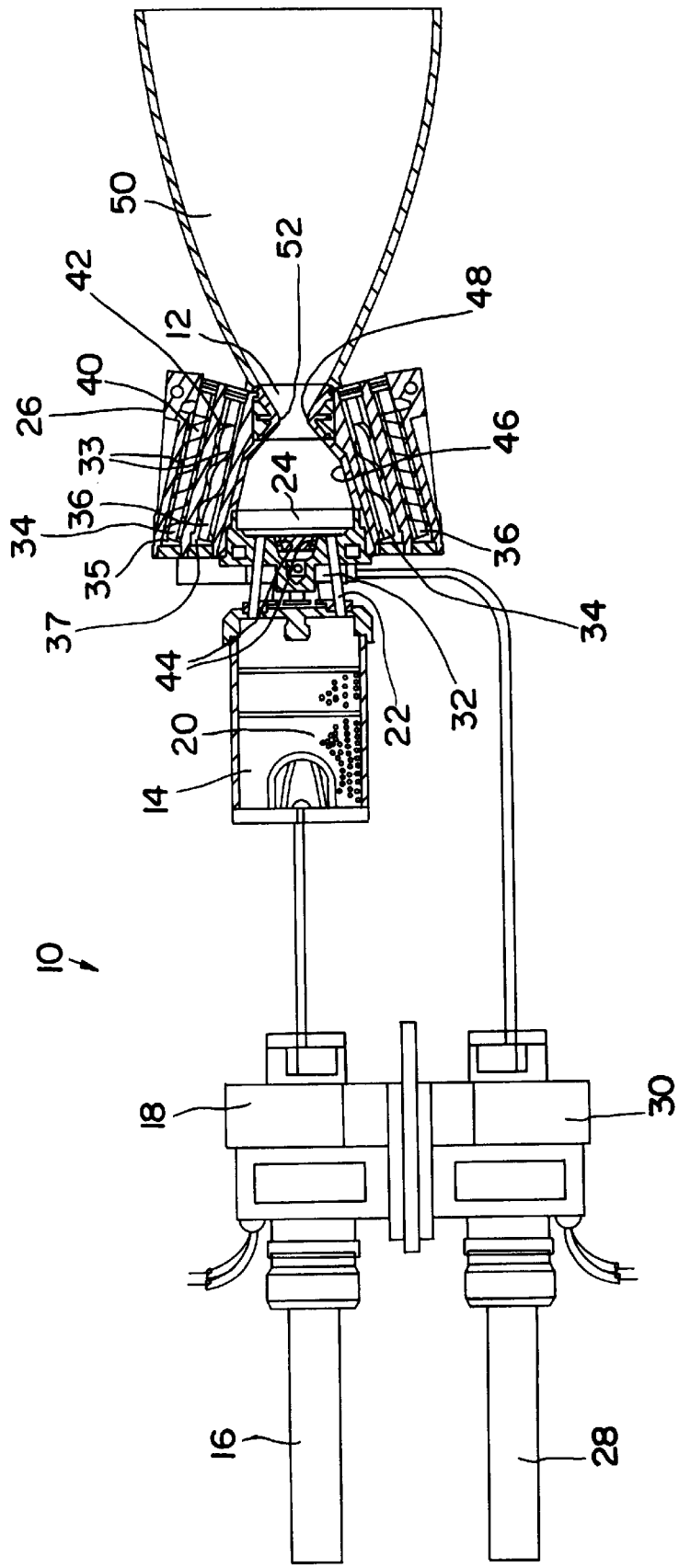
FIG. 1 is a cross-sectional view of a regeneratively cooled bipropellant rocket thruster incorporating a throat insert made in accordance with the teachings of the present invention.

Referring to FIG. 1, there is shown a cooled bipropellant rocket thruster 10 having a throat insert 12 incorporated therein. Thruster 10 has a hydrazine ($N_2H_4$) decomposition chamber 14. Hydrazine, utilized as a fuel for thruster 10, flows from the inlet line 16 through a control valve 18 to a catalytic bed of active material 20, such as iridium coated alumina oxide which promotes exothermic decomposition of the hydrazine within decomposition chamber 14. The highly exothermic decomposition of hydrazine results in the product gasses ammonia, hydrogen, and nitrogen. This decomposition process takes place at a temperature of approximately 1,700 degrees fahrenheit. The product gasses are communicated by injectors 22 to a second reaction chamber defined as a thruster chamber 24 contained within thruster housing 26.

A liquid oxidizer, such as nitrogen tetroxide ($N_2O_4$) or liquid oxygen, is supplied to thruster 10 by inlet line 28 and passing through a control valve 30. The liquid oxidizer enters a central portion 32 of thruster chamber 24, and is distributed to a cooling passage 33 having a first passage portion 34 and other passage portions 36. While FIG. 1 shows only two cooling passages 33, it will be understood by one skilled in the art that any number of cooling passages 33 could be spaced around thruster chamber 24 in thruster housing 26 as required to properly cool thruster housing 26.

The liquid oxidizer acts as a coolant by flowing through passage 33, entering at inlet 35 and exiting at outlet 37, within thruster housing 26 and absorbing heat which is created in thruster chamber 24 by the combustion of the product gasses and the gassified oxidizer. While absorbing heat the liquid oxidizer is transformed from the liquid state to a heated gas phase. When the oxidizer has travelled the entire length of cooling passage 33 and reached the outlet 37, it should be substantially 100% gas. The latent heat of vaporization of the oxidizer will have absorbed the heat transferred from the hot product gasses in thruster chamber 24 and will have accomplished the majority of cooling of thruster housing 26.

The heating and phase change, from liquid to gas, accomplished in cooling passage 33 is assisted by use of flow swirlers 40 and 42. One skilled in the art would understand that flow swirlers 40 and 42 are used to swirl the mixture of liquid and gas in order to transfer more heat to the liquid and to help remove the gas from the passage walls. One skilled in the art would further understand that although two cooling passage portions 34 and 36 are represented in the present embodiment, more passage portions may be required to adequately cool thruster housing 26 and transform the liquid oxidizer into a fully gaseous state.

The oxidizer, having been transformed to a gaseous state, is superheated to approximately 250 degrees to 300 degrees fahrenheit and is communicated from the outlet 37 of cooling passage 33 to oxidizer injector 44. Oxidizer injector 44 directs the flow of gaseous oxidizer such that it is mixed with the product gasses passing through injectors 22. The product gasses and gaseous oxidizer secondarily react to produce a strongly exothermic reaction at approximately 5,000 degrees fahrenheit.

There exists a large thermal gradient between the inner wall 46 of thruster chamber 24 and cooling passage 33 contained in thruster housing 26. This thermal gradient is particularly severe at the throat 48 of nozzle 50. The large thermal gradient can cause local yielding of the material of thruster housing 26 between the inner surface 52 of throat 48 and cooling passage 33. This localized yielding can result in a phenomena called thermal ratcheting, which is an inward shrinkage of throat 48 after each thermal cycle.

Figure 2:
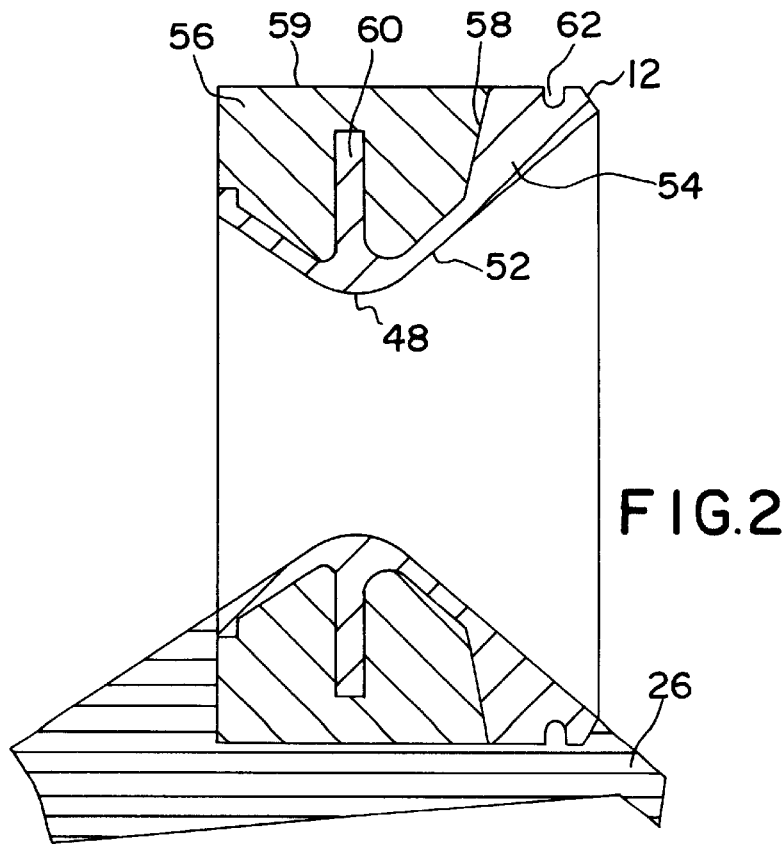
FIG. 2 is a detailed cross-sectional view of a throat insect made in accordance with the teachings of the present invention.

With reference now to FIGS. 1 and 2, throat insert 12, shown in detail in FIG. 2, is constructed of a thin walled shell 54 made of a material having a high yield strength and a high oxidation resistance. Several alloys, for example, those having nickel, chrome, and cobalt therein, are known to exhibit properties meeting these criteria, as are other alloys or superalloys. Materials which are currently available and which would be appropriate for making shell 54 include, but are not limited to, materials available under the Commercial Designations WASPALOY, RENE 41, INCONEL ALLOY 625, HASTELLOY X (Note-HASTELLOY 8), and UDIMET. These alloys are available from Cabot Corp., Carpentio Technology, Cyclops Corp., and Simmonds Steel Corp. These materials have relatively low thermal conductivity and hence shell 54 must be relatively thin to prevent large thermal differentials.

A casing 56 of material having a high thermal conductivity relative to that of shell 54 is therefore molded to the outer surface 58 of shell 54 to transfer the heat from shell 54 to the thruster housing 26 and ultimately to cooling passage 33. The thermal conductivity of casing 56 is at least 10 times greater than that of the shell 54. Materials such as pure copper, silver, gold, nickel, and other materials having a thermal conductivity similar to those listed, are appropriate materials for this application. A thin plating (0.002 to 0.005 inches thick) of material, such as sulfamate nickel, may be added to the outer surface 58 of shell 54 to improve the wettability of the high thermal conductivity material of casing 56 to the high yield strength, high oxidation resistant material of shell 54. The nickel plating may also be used to reduce gain boundary attack of the shell 54 by the casing material 56 during high temperature vacuum casting. Casing 56 has an exterior surface 59 which is generally cylindrical such that it can be mated with and furnace brazed to thruster housing 26.

To further reduce any potential effects of thermal ratcheting, an annular stiffening ring 60 is formed in shell 54 at the throat 48 of throat insert 12. The stiffening ring 60 provides a structurally stable throat diameter by resisting the radially inward forces created by any local yielding that may occur near inner surface 52 due to thermal cycling. In effect, the hoop stresses that occur due to the local yielding are counteracted by the circumferential forces of stiffening-ring 60.

The shell 54 of throat insert 12 further includes an annular braze ring groove 62 which is utilized to assure proper retention and sealing of throat insert 12 to thruster housing 26. Throat insert 12 is furnace brazed into thruster housing 26 using high temperature vacuum brazing techniques or other processes which result in a joint with high temperature capability.

Figure 3:
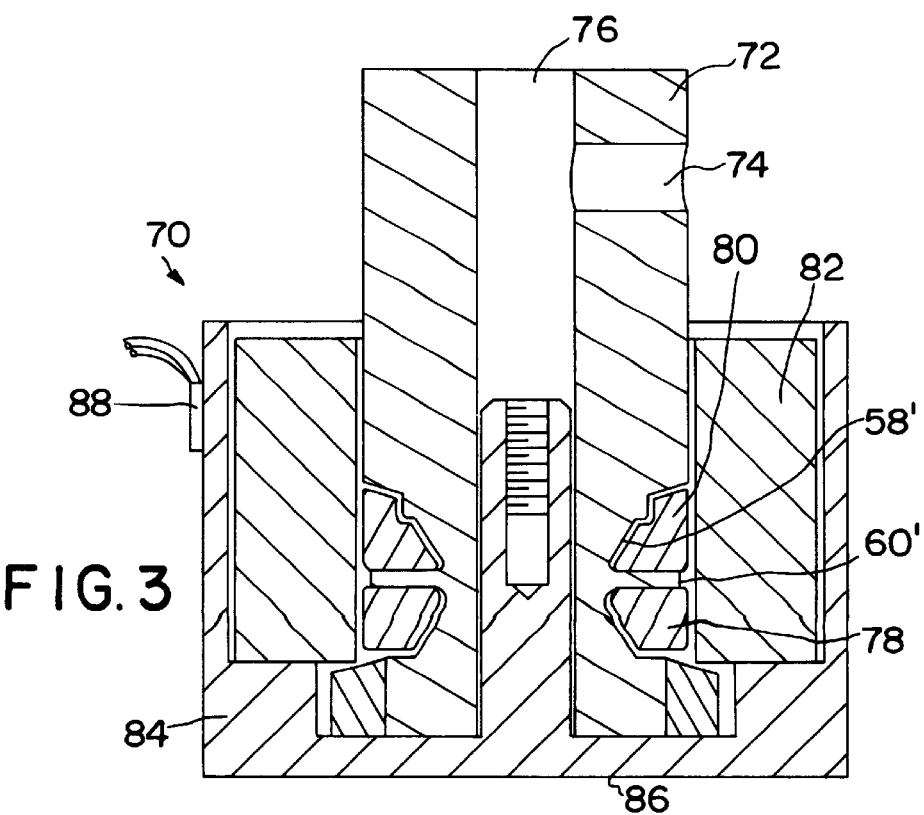
FIG. 3 is a cross-sectional view of an in-process assembly employed in the method of producing a throat insert of the present invention.

With reference now to FIG. 3, there is shown an in-process assembly 70 utilized in fabricating throat insert 12. High temperature vacuum casting is a preferred method in the present embodiment. A preform 72 is fabricated from the high strength, oxidation resistant material which will later be machined to form the thin walled shell 54 (shown in FIGS. 1 and 2). Specific contours are formed within preform 72 which will correlate to the annular stiffening ring 60 and to outer surface 58 of shell 54. These contours are indicated by reference numerals 60' and 58' in FIG. 3. After fabrication, preform 72 is plated with a thin plating of material, such as sulfamate nickel plating, to improve wettability of the high thermal conductivity material which will form casing 56. This thin plating also protects the material of preform 72 from grain boundary attack during the casting process which follows. Preform 72 also contains holes 74 and 76 which are used in subsequent machining operations in the formation of throat insert 12. Holes 74 and 76 may be masked during the plating process in order to insure their dimensional accuracy for reference during the subsequent machining process.

Three fillers 78, 80, and 82 are positioned around preform 72, and are made of a high thermal conductivity material (such as pure copper, silver, gold, or nickel) which will constitute the material of casing 56 upon completion of the manufacture of throat insert 12. Preform 72 and fillers 78, 80, and 82 are placed in a housing 84 designed to position preform 72 and contain fillers 78, 80, and 82 during the casting process. Housing 84 may be fabricated from steel or any other compatible material.

Once preform 72 and fillers 78, 80, and 82 are placed in housing 84, thereby creating in-process assembly 70 as shown in FIG. 3, they are placed in a high temperature vacuum brazing furnace or other similar furnace such as an inert gas or hydrogen brazing furnace. A high temperature insulator (not shown) is placed over the top of assembly 70 such that assembly 70 is heated and cooled from a lower surface 86 of housing 84. The intent of providing a high temperature insulator is to insure that upon cooling, the molten fillers 78, 80, and 82 solidify from the bottom toward the top. This assures that any shrinkage voids which may occur are outside of the throat insert 12 when completed.

Thermocouple 88 is attached to housing 84 to monitor the temperature of assembly 70 as it is heated and later cooled. The furnace temperature is set at approximately 2,100 degrees fahrenheit and the temperature of assembly 70 is monitored by way of thermocouple 88. Fillers 78, 80, and 82 melt at approximately 2,000 degrees fahrenheit, the exact temperature depending upon the specific material selected, and during this time the monitoring thermocouple 88 is locked at the melt temperature. After melting is complete, the temperature is slightly increased, to approximately 2,050 degrees fahrenheit, and the furnace is turned off allowing assembly 70 to cool and the fillers 78, 80, and 82 to solidify. The molten fillers 78, 80, and 82 wet the plated preform 72 like a brazing alloy and fill the cavity machined into preform 72.

Once assembly 70 is completely cooled preform 72 and the material which made up fillers 78, 80, and 82, now molded to preform 72, is removed from housing 84. Machining operations utilizing holes 74 and 76 as dimensionally stable locating points are conducted to form the final throat insert 12 shown in FIG. 2. Throat insert 12 is then vacuum furnace brazed using a brazing alloy, such as gold/nickel, into thruster chamber 24 of thruster housing 26. The brazing alloy used should have a melt temperature below that of the material used for fillers 78, 80, and 82, which now constitutes casing 56.

The foregoing discussion discloses and describes a preferred embodiment of the present invention. One skilled in the art will readily recognize from such discussion, and from the accompanying drawings and claims, that various changes, modifications, and variations can be made therein without departure from the true spirit and fair scope of the invention as defined in the following claims.

What is claimed is:

1. A method for making a throat insert for a rocket engine having a housing therein, the method comprising the steps of;
    fabricating a preform of a material having a high yield strength and a high oxidation resistance, die preform having contours;
    positioning fillers around the preform;
    assembling the preform and the fillers in a housing to create an in-process assembly;
    heating the assembly such that the fillers become molten and conform with and wet the contours of the preform;
    cooling the assembly such flat the fillers solidify and are formed with and adhere to the preform; and
    forming machining operations upon the assembly to produce the throat insert, the preform forming a thin walled shell of the throat insert and the fillers forming a casing of the throat insert.

2. The method of claim 1 wherein an insulator is positioned over the in-process assembly such that the assembly is generally heated and cooled by way of a lower surface of the housing.

3. The method of claim 1 further comprising the step of plating the preform with a material prior to positioning the fillers around the preform.

4. The method of claim 1 further comprising the step of adhering the throat insert to the housing of the rocket engine.

5. The method of claim 1 wherein the fillers are made from a material having a thermal conductivity at least 10 times greater than that of the preform.

6. In a method of making a throat insert for a rocket engine, said method comprising the steps of:
    (a) positioning a filler adjacent to a preform in a housing, said preform being selected from the group of nickel, chrome, and cobalt alloys which exhibit high strength and oxidation resistant characteristics; said filler being selected from the group of copper, silver, gold and nickel having a thermal conductivity greater than the thermal conductivity of the preform;
    (b) placing the housing in a vacuum brazing furnace to melt the filler so that it adheres to portions of the preform to form an assembly having a throat lined with material from the preform and outer portions formed from the filler material;
    (c) removing the housing from the furnace and permitting the melted filler to solidify; and
    (d) removing the assembly from the housing.

7. The method of claim 6 which further comprises, prior to step (a):
    plating the preform with nickel.

8. The method of claim 6 wherein the preform is in the shape of a thin walled shell defining interior surfaces of the throat insert, and wherein the material of the filler defines a cylindrical outer casing for the throat insert, and wherein the method further comprises:
    installing the throat insert by brazing outer surfaces of the casing to a housing of a thruster chamber of the rocket engine.

9. The method of claim 6 which further comprises;
    machining the assembly; and
    installing the assembly into a housing of the rocket engine.

* * * * *